United States Patent
Anderson et al.

(10) Patent No.: US 6,671,674 B1
(45) Date of Patent: Dec. 30, 2003

(54) COMPUTER-BASED AUCTION AND SALE SYSTEM

(76) Inventors: Claude T. Anderson, 7595 214th St. N., Forest Lake, MN (US) 55025; Michael G. Rieth, 1810 Brighton Trail, Woodbury, MN (US) 55125

( * ) Notice: Subject to any disclaimer, the term of this patent is extended or adjusted under 35 U.S.C. 154(b) by 0 days.

(21) Appl. No.: 09/526,897

(22) Filed: Mar. 16, 2000

(51) Int. Cl.[7] .............................................. G06F 17/60
(52) U.S. Cl. ............................ 705/26; 705/37; 705/80
(58) Field of Search ............................. 705/26, 37, 80

(56) References Cited

U.S. PATENT DOCUMENTS

| | | | |
|---|---|---|---|
| 5,715,314 A | | 2/1998 | Payne et al. |
| 5,774,873 A | * | 6/1998 | Berent et al. ................. 705/26 |
| 5,794,207 A | | 8/1998 | Walker |
| 5,890,138 A | * | 3/1999 | Godin et al. ................... 705/26 |
| 5,895,454 A | | 4/1999 | Harrington |
| 5,905,975 A | | 5/1999 | Ausubel |
| 5,930,767 A | | 7/1999 | Reber et al. |
| 5,960,411 A | | 9/1999 | Hartman et al. |
| 5,966,699 A | | 10/1999 | Zandi |
| 6,012,045 A | * | 1/2000 | Barzilai et al. ............... 705/37 |
| 6,021,398 A | | 2/2000 | Ausubel |
| 6,101,484 A | * | 8/2000 | Halbert et al. ................ 705/26 |

FOREIGN PATENT DOCUMENTS

| | | | | |
|---|---|---|---|---|
| EP | 0 987 644 A2 | * | 3/2002 | ............ G06F/17/60 |
| WO | WO 01/22326 A1 | * | 3/2001 | ............ G06F/17/60 |

OTHER PUBLICATIONS

Goldstein, "Write an essay, win a home", Mar. 1994, Incentive vol. 168, Issue 3, 2 pages.*

Guasch et al., "Using auctions to allocate and price long–term credit", Jul. 1993, World Bank Research Observer, v8n2, 20 pages.*

Guasch, J. Luis, Glaessner, Thomas, Using auctions to allocate and price long–term credit; World bank Research Observer, v8n2 pp: 169–194, Jul. 1993.*

* cited by examiner

*Primary Examiner*—James P. Trammell
*Assistant Examiner*—Cristina O Sherr

(57) ABSTRACT

A computer-based method and system for executing an auction. The invention discloses a method for conducting an online auction in which a nonredeemable fee is collected from each auction participant to enter the bidder pool for a particular item. The collective nonredeemable fees from all bidders are then allocated to reduce the minimum bid required to purchase the item for the seller's asking price and to pay the transactional costs associated with the auction. Using this invention, a high value item can be purchased at very low cost to the high bidder, without the seller having to accept a reduced price for the item. Furthermore, this invention is amenable to a wide variety of auction systems because the computer-based auction and sale system can ensure the seller obtains their asking price for an item without requiring that the item be awarded to the high bidder.

8 Claims, 14 Drawing Sheets

Fig. 3

BidIt

Buy for less....

com

Sell for more !

Purchase nonrefundable *Shares* for the opportunity to bid on a selected item!

Type of Bids

Register to Sell and Bid

Get Ownership Verification and Appraisal for an Item

Get Pre-Approval for a Bid Amount

Search Items up for Bid - List an Item for Bidding

| Just in ... | | |
|---|---|---|
| | Share Price per Bid: | $100 |
| | Shares Required to Close Bidding: | 600 |
| | Shares to date: | 60 (10% complete) |
| Acura 2000 NSX Sport Coupe 2D (6-Spd.) | Minimum bid: | $30,000 |
| | Bidding criteria: | Evaluated bid goes to 300th highest bidder (50th percentile) |
| Appraised Market Value: $84,000 | | |
| | Date Posted: | 03/15/99 |
| bid on this item | NOTE: All bidders pay a nonrefundable Share Price ($100), unless the listing is withdrawn prior to the closing of the bid. The winning bidder will also pay the amount of their bid. | |
| Preapproval of Bid Amount is Required | | |

*this website is for demonstration purposes ONLY*

Top of Page - About BidIt

Fig. 4

BidIt  com

Buy for less.... 

Sell for more !

Home - Search for Bid Items - Place an Item up for Bid

DIFFERENT WAYS TO BUY AND SELL

Selection Bid - award is selected at random !
-Sellers set a *Share Price*, a *Bid Closing* amount ( # of Shares purchased x the *Share Price*) and, if desired, also set a *Minimum Bid* amount which is paid by the randomly selected bidder.
-Buyers purchase one or more nonrefundable *Shares* at the *Share Price*, each with an equal chance of being selected.
-Award of bid takes place when the total of the purchased *Shares* equals the *Bid Closing* amount; the Item is awarded to a randomly selected *Share*. Sellers receive the *Bid Closing* amount of the Item, plus the requested *Minimum Bid* amount, if any*.

Evaluated Bid - use your skills to properly buy and sell an item !
-Sellers set a *Share Price*, a *Bid Closing* amount ( # of Shares purchased x the *Share Price*), a *Minimum Bid* amount (the lowest acceptable *Bid Offer*) and also set an *Evaluation Criteria* for determining the award of the bid, e.g. the bid closest to the midpoint bid (the 50th percentile bid), the 90th percentile highest bid, the 10th percentile lowest bid, etc.
-Buyers purchase one or more nonrefundable Shares, and, for each share, submit a *Bid Offer* that is greater than the *Minimum Bid* amount.
-Award of bid takes place when the total of the purchased *Shares* equals the *Bid Closing* amount; the item is awarded to the *Share* which has a *Bid Offer* closest to (but not greater than) the predetermined bid evaluation criteria, e.g. with 600 bidders, the 50th percentile bid is the 300th ranked bid. Sellers receive the *Bid Closing* amount of the item, plus the amount of the awarded *Bid Offer**.

Limited Bid - highest bid is awarded to a select few !
-Sellers set a *Share Price*, a *Bid Closing* amount ( # of Shares purchased x the *Share Price*) and a *Minimum Bid* amount (the lowest acceptable *Bid Offer*).
-Buyers purchase one nonrefundable Share and submit a high *Bid Offer* (greater than the *Minimum Bid* amount).
-Award of bid takes place when the total of the purchased *Shares* equals the *Bid Closing* amount; the item is awarded to the *Share* which has the highest *Bid Offer* (and received first, in case of a tie). Sellers receive the *Bid Closing* amount of the item, plus the amount of the awarded *Bid Offer**.

See our Strategy Table

* minus transaction fees for placing an item up for bid

*this website is for demonstration purposes ONLY*
Top of Page - About BidIt

Fig. 5

BidIt  com

Buy for less.... 

Sell for more !

Home - Search for Items up for Bid - List an Item for Bidding

STRATEGY FOR BUYERs AND SELLERs

|  | Selected Bid | Evaluated Bid | Limited Bid |
|---|---|---|---|
| Buyer | The more shares you purchase, the more opportunities you have to own the item. Some buyers may prefer the risk of losing higher nonrefundable share prices, or a required higher payment upon award of the bid, thereby increasing the chances of being selected. Others may prefer low share prices with no additional payment to purchase. | The nonrefundable shares contribute to the price of the item. Make a skillful Bid(s) based on your estimate of how the bids will be ranked. For some items, low (10th) percentile criteria, which encourages lower Bid Offers, are attractive. But this requires more bidders, invites more competition for being selected and takes longer to complete. Depending on the item, a 50th percentile bid may be a good compromise, or a 90th percentile bid may be preferred. | Unlike a conventional "highest bid", nonrefundable shares contribute to the price of the item and limit the number of bidders. Buyers who are able to risk losing a high Share Price find lower purchase prices and less competition for being selected. |
| Seller | Know your item and its potential bidders. Set a low share price if buyers are sensitive to the loss of the nonrefundable share price. Make the process go faster by including a payment (Minimum Bid) for purchasing the item. | Again, know your item and its potential buyers. By manipulating the Share Price, the evaluation criteria and the Minimum Bid amount, you will be able will spotlight buyers for your item, from focused, time-sensitive risk takers to casual hopefuls. | Encourage competition to get the highest price for your item, bought down in part by the contribution of nonrefundable shares. But, are other bidding options quicker and more attractive to the buyers for your item? Again, know your item and its potential buyers. |

*this website is for demonstration purposes ONLY*

Top of Page - About BidIt

Fig. 6

BidIt 
com

Buy for less.... 

Sell for more !

Home - Search for Items up for Bid - List an Item for Bidding

SEARCH FOR SELECT ITEMS

| Item category | ☑ Cars\Trucks  ☐ Planes  ☐ Boats  ☐ Motorcycles  ☐ Buildings  ☐ Homes  ☐ Real Estate  ☐ Franchises  ☐ Vacations  ☐ Jewelry  ☐ Other |
|---|---|
| Bid status | ☑ <25% complete  ☐ >90% complete  ☐ completed |
| Date Posted: | ☑ within the last hour  ☑ within the last day  ☑ within the last week  ☐ within the last one month  ☐ more than one month |
| Share Price: | ☑ $1  ☑ $1-$10  ☑ $10-$100  ☐ $100-$1000  ☐ >$1000 |
| Minimum Bid: | greater than $1,000 and less than $50,000 |
| Shares required for Bid Closing: | ☑ <10  ☑ 10-100  ☑ 100-500  ☑ 500-1,000  ☐ 1,000-10,000  ☐ 10,000-100,000  ☐ 100,000-1,000,000  ☐ > 100,000 |
| Type of Bid: | ☑ Selected by chance  ☑ Highest Bid OR Evaluated by the following criteria ☑ 10th percentile bidder  ☑ 50th percentile  ☑ 90th percentile |
| Item condition: | ⦿ New  ○ Used |
| Item Appraisal Status: | ⦿ Appraised  ○ Not Appraised (default = both) |
| Required Bid PreApproval? | ⦿ Required  ○ Not Required (default = both) |

*this website is for demonstration purposes ONLY*

Top of Page - About BidIt

Fig. 7

BidIt 

Buy for less....

com

Sell for more !

Home - Search for Items up for Bid - List an Item for Bidding

SELECTED ITEMS: Appraised New Cars\trucks, Items Posted within the last week, Bid < 25% complete,
Share Price <= $100, Minimum Bid < $60,000, Less than 1,000 Shares Required to Close Bidding,
Any Type of Bid, Pre-approval of Bid Amount is Required - change selections

| Click on a column heading to sort by it | | | | | | |
|---|---|---|---|---|---|---|
| Item | Description | Bid Completion | Share Price | Minimum Bid Amount | Appraised Value | Date Posted |
| ... | ... | ... | ... | ... | ... | ... |
| Acura 2000 NSX | Sport Coupe 2D (6-Spd.) more detail | 60 / 600 (%10 complete) | $100 | $30,000 | $84,000 | 3/15/ |
| ... | ... | ... | ... | ... | ... | ... |
| ... | ... | ... | ... | ... | ... | ... |

*this website is for demonstration purposes ONLY*

Top of Page - About BidIt

Fig. 8a

BidIt  com

Buy for less.... 

Sell for more !

Return to Item List - Bid on this Item

ITEM DETAIL - Questions and Answers about this Item (discussion group)

Acura 2000 NSX NA213YPKW

Sport Coupe 2D (6-Spd.)

ENGINES
--- V6, 194", 24V, PFI, VTEC (3.2 Liter) Std.

TIRES
--- (2) P215/45ZR16 Front & (2) P245/40ZR17 Rear High Performance Std. Std.

EXTERIOR COLOR--- Yellow, Spa Pearl

INTERIOR COLOR
--- Onyx

--------- STANDARD EQUIPMENT ---------

Air Conditioning, Automatic
Alarm System w/Engine Immobilizer
Alternator, 120-Amp.
Antenna, Power
Axle, 4.06 Ratio Limited Slip Rear
Brakes, Power F&R Disc
Braking System, Anti-Lock
Console w/Storage
Cup Holders, (2)
Defroster, Rear Window
Door Locks, Power
Door Trim Panels, Leather
Drivetrain, RWD
Engine: V6, 24V, PFI, VTEC, 3.2 Liter
Fuel Filler Door Release, Remote Control
Fuel Tank, 18.5 Gal. Cap.
Gauges, Oil Pressure & Voltmeter
Mirrors, Dual Power
Radio System, Acura/Bose: AM/FM Stereo w/Cassette
Restraint System, Dual Front Air Bag
Seats, Leather Bucket w/Dual 4-Way Power
Speed Control
Spoiler, Rear
Stabilizer Bars, F&R
Steering Wheel, Leather-Wrapped Tilt & Telescoping
Steering, Variable Assist Power
Tachometer
Tires, (2) P215/45ZR16 Front & (2) P245/40ZR17 Rear High Performance
Traction Control
Trans., 6-Spd. Manual w/Overdrive
Trunk Release, Remote Control

Fig. 8b

W/S Wipers, Variable Intermittent
Wheels, Forged Aluminum Alloy
Windows, Power

General Specifications:
W.B. 99.6"; O.L. 174.2"; Width 71.3"; Height 46.1"; Cargo Cap. 5.0 cu. ft.; Curb Weight 3069-lbs. - 3208-lbs.

Warranty:
4-yr/50,000-mi Limited Bumper-to-Bumper; 4-yr/50,000-mi 24-hr Roadside Assistance; 5-yr/Unlimited-mi Limited Outer-Body Rust-Thru.

Engine Specifications:
Cylinders V6; Liters 3.2; Fuel Induction 24V VTEC; HP 290; Torque 224; EPA City 17; EPA Hwy 24

*this website is for demonstration purposes ONLY*
Top of Page · About Bidit

Fig. 10a

BidIt         Buy for less....

com           Sell for more !

Home - <u>Search for Items up for Bid</u> - List an Item for Bidding

LIST AN ITEM FOR BIDDING

You must be registered on this site to list an item. <u>Register to Sell and Bid</u>

AUTHORIZATION
Site Username: [Blueberry]
Password: [          ]

ITEM DESCRIPTION
Item Condition: ● New ○ Used

Item category: [Cars/trucks]
recommend a new category
[          ]

Item Short Description:
Make/ Model/ Style / Yr
(as applicable)

[Acura 2000 NSX NA213YPKW Sport Coupe 2D (6-Spd.)]
(twenty-five words or less)

Item Long Description and Photo:
(as applicable)

[          ]

Insert detailed descriptive text above, or attach file (*.htm) below

Attach a Photo (gif,jpg) file, a Description file, or both, as desired

[a:\yellow.jpg]     [          ] files (attached
[description.htm]

Estimated Item Value: [$84,000]

I declare that I have the legal authority to sell the listed item.    ● Yes

BID REQUIREMENTS
Evaluation Criteria:
○ selected bid
○ 10th percentile bid
● 50th percentile bid
○ 90th percentile bid
○ highest bid Bid Closing amount: [$60,000]
Minimum Bid: [$30,000]

Fig. 10b

Calculated Minimum Sale price = $90,000
Bid Opening Price + Minimum Bid

Share price: $100

Calculated Shares required = 600

Require Bid Amount PreApproval on all submitted bids?   ⦿ Yes   ○ No

- OR -

*you will receive a sales confirmation number via email* timestamp:03/15/00 09:53:42 AM

*this website is for demonstration purposes ONLY*
Top of Page - About BidIt

Fig. 11a

BidIt  com

*Buy for less....*

*Sell for more !*

Home - Search for Items up for Bid - List an Item for Bidding

REGISTRATION PAGE

Please provide the following billing information:

| First name | Initial | Last name |
|---|---|---|
|  |  |  |

Organization (if applicable): 
Title (if applicable): 
Street Address (line 1): 
Address (line 2): 
City: 
State/Province: 
Zip/Postal Code: 
Country: 
Work Phone: 
FAX: 
E-mail: 
Method of payment: Approved lender #
see list of Approved Lenders
Lender #: 
$ Limit:

VISA
\# 
Credit card  exp. date: 
$ limit:

Purchase Order #: 
$ Limit:

Please provide contact information, if different from billing information:

Full Name [                    ]
Title [                    ]
Organization [                    ]
Street Address [                    ]
Address (cont.) [                    ]
City [                    ]
State/Province [                    ]
Zip/Postal Code [          ]
Country [              ]
Work Phone [              ]
Home Phone [              ]
FAX [              ]
E-mail [              ]

Site username: [              ]
Type a password: [              ]
Retype it: [              ]

*this website is for demonstration purposes ONLY*
Top of Page · About Bidit

COMPUTER-BASED AUCTION AND SALE SYSTEM

BACKGROUND OF THE INVENTION

This invention relates to a computer-based auction and sale system for the selling or purchasing of products and services via an electronic auction and sale system through the use of remote terminals.

With the increasing popularity of the internet, computer-based systems have become an extremely popular method for buying and selling a variety of products. U.S. Pat. No. 5,960,411 to Hartman et al. discloses a method and system for making purchase orders over a communication system which may be used in conjunction with a computer-based auction system. U.S. Pat. No. 5,895,454 to Harrington discloses an integrated interface for vendor/product oriented Internet websites which may be used in conjunction with a computer-based auction system. Auction systems allow buyers to obtain products at competitive prices with the additional excitement and skill of the buyer who participates in the auction process and makes fast decisions whether to participate or to recognize the price has become too high. The standard auction process involves users bidding for a particular product, and the product is sold to the highest bidder.

One type of computer based auction for the sale of products utilizes e-mail sent over the internet. In this case, bidders send e-mail to the auction site with details of their bid and identity. Details of the bid are posted on the auction site and are available to other participants. The auction process typically has a time period of several days or weeks, and the product is sold to the highest bidder. One of the advantages of this system is the lack of complexity in running of the auction process over the internet where e-mail is used to communicate with the auction computer.

Computer-based auctions can also be conducted entirely over the Internet. U.S. Pat. No. 5,905,975 to Ausubel discloses a computer implemented method and apparatus for auctions and U.S. Pat. No. 6,012,045 to Barzilai discloses a computer-based electronic bid, auction and sale system. U.S. Pat. No. 5,966,699 to Zandi discloses a system and method for conducting loan auctions over computer networks. These disclosures may be used in conjunction with the present invention. With a typical auction, the seller provides information about the item, a very low initial starting price, a time when bidding will be closed and optionally, a reserve price that is only disclosed to the auction software and not available to bidders. Bidding proceeds as bidders incrementally raise the bid price as the bidding progresses. At the close of bidding, the high bidder obtains the product for the amount bid. However, if at the time of putting the product up for auction, the seller had included a reserve price that was higher than the high bid, the seller has the option of not selling the product to the high bidder. At the time a bidder, say Bidder No. 1, submits the incrementally high bid, Bidder No. 1 may also provide a maximum bid that is only disclosed to the auction software and not disclosed to other bidders or the seller. As other bids are received, the auction software will automatically incrementally increase Bidder No. 1's bid as necessary to remain the high bidder. This bid amount will not be increased above Bidder No. 1's maximum bid. In this manner, Bidder No. 1 will not have to constantly monitor the bidding process. Typically, the auction software will then notify the bidder by e-mail when they are no longer the high bidder. Computer-based auctions are popular because of the large number of buyers that can participate on an individual auction. Bidding often extends over a period of several days to allow time for a number of buyers to find the item. Typically there is a flurry of activity in the last portion of the auction process.

Another form of computer-based auction is the reverse auction where the price of the product decreases in a set manner during the time period of the auction and each participant is provided with the current price, the quantity on hand and the time remaining in the auction. U.S. Pat. No. 5,890,138 to Godin, et al, discloses a computer-based reverse auction process. This type of auction, typically, takes place over a very short period of time and there is a flurry of activity in the last portion of the auction process. The auction terminates when there is no more product to be sold or the time period expires.

Computer-based auctions are popular because, as in auctions generally, if the reserve price is met, a seller can be relatively certain of finding a buyer for the product. In addition, if a seller finds a high level of interest in an item, multiple bidders can produce very good selling prices for the seller. Buyers, on the other hand can often obtain a product at a favorable price.

The disadvantage of the disclosed auctions is that when the seller obtains a better than expected selling price it typically means the bidder overpaid. On the other hand, if the bidder obtained a really good deal, it probably means the seller had to take a price less than they would have liked. There may be circumstances when a party is highly motivated and is very pleased at selling a product at a low price or buying a product at a relatively high price, however generally any highly favorable selling price to one party must come at some expense to the other party. One approach to address this issue is described under U.S. Pat. No. 5,794,207 to Walker which discloses a buyer-driven network system for purchase of goods and services.

One popular method used by consumers to reduce the purchase price for individual items is to join buying clubs. In this manner, each member pays a membership fee to the buying club. This fee helps defer the costs of products and, probably more importantly, assures the buying club that the members will actually purchase from the club. The buying club, representing many individuals, is in a favorable negotiating position as a buyer and can make use of volume discounts and obtain favorable prices from producers. The consumer in exchange for the membership fee has the right to obtain the products the buying club purchases at the discounted prices. In this manner, a buying club can obtain selling prices that are favorable to both the buyer and seller.

The present invention provides the advantages of the computer-based auction process by incorporating a membership fee requirement into each purchase. These membership fees, also referred to as nonredeemable shares, can be aggregated among all the bidders to be used to pay the seller for a portion or up to the entire selling price the seller would accept for the product. Therefore the eligible bidders, having purchased the nonredeemable share, will be able to bid on the item with a relatively low or no reserve since the seller will already have received all or a significant portion of the reserve price from the eligible bidders.

It is an object of the present invention to provide a computer-based method of purchasing or selling products and services via a computer-based auction and sale system.

It is an additional object of the present invention to provide a computer-based method of purchasing or selling products and services that will allow purchase of the non-redeemable share to prequalify bidders for eligibility in the auction.

It is an additional object of the present invention to provide a computer-based method of purchasing or selling products and services that will utilize the aggregate membership fees or nonredeemable shares paid by all bidders to pay for all or a substantial portion of the auctioned product or service to the seller.

It is an additional object of the present invention to provide a computer-based method of purchasing or selling products and services that will utilize the aggregate membership fees or nonredeemable shares paid by all bidders to pay for all or a substantial portion of the transactional costs associated with operating the auction site for the use of the buyer and seller.

It is an additional object of the present invention to provide a computer-based method of purchasing or selling products and services that will utilize the aggregate membership fees paid by all bidders to allow the high bidder to obtain the product or service for a value substantially less than the amount received by the seller receives for the product or service.

It is an additional object of the present invention to provide a computer-based method of purchasing or selling products and services that can be used with a variety of auction systems or selling systems.

It is an additional object of the present invention to provide a computer-based method of purchasing or selling products and services that can be used to allow bidders to obtain items such as businesses, real estate, automobiles or luxuries that bidders normally could not afford to purchase outright without financing.

It is a further object of the present invention to provide a computer-based auction system wherein a nonredeemable share is purchased or a membership fee is collected from each bidder on a product, the aggregate membership fees are then credited towards paying for the product being auctioned.

It is a further object of the present invention to provide a computer-based auction and sale system wherein the computer system establishes a virtual showroom which electronically displays the products and services offered for sale and certain other information, such as the manufacturer's suggested retail price, appraisal information, and bid cycle data which enables the potential purchaser or customer to view the product, view information regarding the product and place a bid or a number of bids to purchase the product.

It is an additional object of the present invention to provide a computer-based auction and sale system wherein the seller or bidder may develop strategic buying and selling methods. It is an additional object of the present invention to provide a computer-based auction and sale system wherein the seller or bidder may develop strategic buying and selling methods.

It is an additional object of the present invention to provide a computer-based auction and sale system wherein the selected buyer of the item is not necessarily the high bidder.

It is an additional object of the present invention to provide a computer-based auction and sale system wherein the seller will have confidence that the submitted are collectable bids and the sale will be consummated by the winning bidder when the auction is completed.

It is an additional object of the present invention to provide a computer-based auction and sale system wherein the seller may include members of the public, manufacturers, suppliers, wholesalers, retailers whom may or may not also be operators of the computer-based auction and sale system.

SUMMARY OF THE INVENTION

The present invention is directed to a method of auctioning products on-line where participants use computer terminals to access a computer site and participate. The present invention provides advantages to existing computer-based auction processes by incorporating a nonredeemable share or membership fee requirement into each purchase. These fees can then be used to pay the seller up to the entire amount needed for the product as well as to cover transactional costs associated with conducting the auction. Since the seller will already have received all or a significant portion of the reserve price through the eligible bidders having purchased the nonredeemable share or paid the membership fee, the bidders will be able to bid on the item without a substantial reserve. This method is amenable to any computer-based auction whereby the bidders can be limited to a group of prequalified bidders. This invention can be used with the conventional consecutive open bid auction by using an open process and allowing the prequalified bidders to bid consecutively increasing amounts on the item. The invention can also be used on a sealed bid type auction where all bidders submit a bid amount which is undisclosed until a predetermined time at which time all bids are reviewed and the item awarded to the high bidder. The invention can also be used for a reverse auction whereby again the only bidders in the auction would be those that prequalified by purchasing the nonredeemable share or paying the membership fee for participating in the auction.

The present invention is not only usable with conventional auction systems, but can also be used with innovative auction systems such as auction systems that award the product to a 1) prequalified bidder on a random basis, 2) a bidder that is not the highest bidder, such as the second highest bidder, or 3) the bidder that is closest to a benchmark that is unknown at the time of bidding, such as the bidder closest to the $50^{th}$, $75^{th}$ or $90^{th}$ percentile of all the bids.

The method comprises allowing sellers to list their items for sale on the auction site, maintaining a computer database of items to be auctioned, allowing visitors to the site to register as prequalified bidders, maintaining a list of prequalified bidders to participate as members in each product auction and carrying out the auction among the prequalified bidders at the designated time.

This method is particularly advantageous for buyers and sellers of high cost items such as businesses, real estate and expensive luxuries, since the funds generated from both the high bidder and the share price or membership fees collected to prequalify all the bidders for the item can be used to pay the sellers asking price. A bidder only risks a relatively small amount as a share price or membership fee for an opportunity to obtain an item that may otherwise either by unaffordable item or require financing.

For each product to be auctioned the seller of the item would provide a description and image of the item to be sold. The seller would also designate the time to initiate bid posting, establish the nonrefundable share price and establish the required numbers of share sales would be sold before the buyer is determined. During the period before bids are accepted, the product would be promoted and interested potential bidders would be registered. The bidding period would begin at the designated time and last until the predetermined number of shares were sold. If the designated time has elapsed before the required number of shares had not been sold, the seller would have the option of closing bidding and selecting a buyer according to the criteria, extending the time period to accept bids, or deciding not to sell the item. If the item was not sold, all bidders would be reimbursed for their share price.

The bidders would pay for the nonrefundable shares with a credit card, but payment could also be accomplished with a debit card, prepaid account, e-cash, check or other means. The bidder that is selected as the buyer may either pay the bid amount as described of may have made financing arrangements for the bid amount.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 illustrates a screen display showing a home page for the computer-based auction system;

FIG. 4 illustrates a screen display showing information explaining alternative bidding processes;

FIG. 5 illustrates a screen display showing a strategy of buyers and sellers;

FIG. 6 illustrates a screen display showing a search form for bidders to use to locate items for bidding in the computer-based data base;

FIG. 7 illustrates a screen display showing the results from a bidders search of the computer-based data base;

FIGS. 8A and 8B illustrate a screen display showing a detailed description of an item for sale in the data base;

FIGS. 10A and 10B illustrate a screen display for an item seller to use to auction an item for sale; and, FIGS. 11A and 11B illustrate a screen display showing an entry form for those users who would like approval to become registered bidders.

DESCRIPTION OF THE PREFERRED EMBODIMENT

The patent asserts a method and system for bidding and procurement using computers and the Internet. The methods allows users to purchase non-refundable shares to provide a bid on an item, similar to a per item membership fee. The non-refundable shares contribute to the total sales price of the item, in the context of various bidding strategies.

One of the primary embodiments of the present invention is the implementation of the computer-based auction and sale system on the Internet. As it is well known, the Internet is a relatively large number of substantially independent computer systems linked together via a telecommunications system. This telecommunications system consists of a large number of telephone lines but also includes long distance telephone lines, satellite communications and other telecommunications routes. The telecommunications system not only handles the electronic data transfer between various computer systems, but also handles voice or audio communications. Certain aspects of the present invention can be carried out via an audio telecommunications link or a voice telecommunications link. However, most of the computer-based auction and sale system can be implemented in a completely electronic environment.

Figure 1:
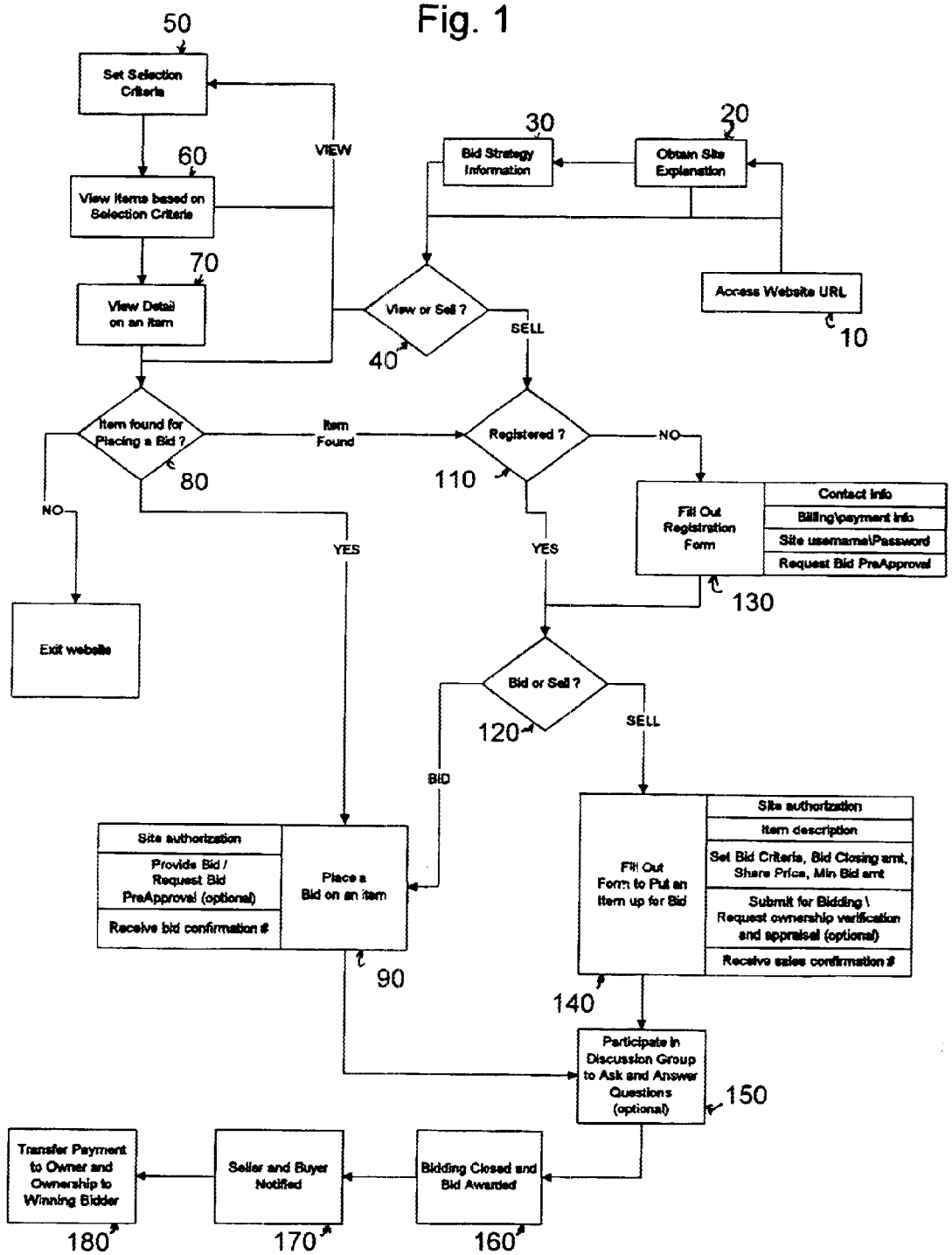
FIG. 1 diagrammatically illustrates the computer-based auction system, the steps to register to sell or bid on the site, the steps to list an item for auction, the steps to bid on an item, and the steps to determine the buyer and close the sale and various branches and internal cross-links to the sources of data.
Figure 2:
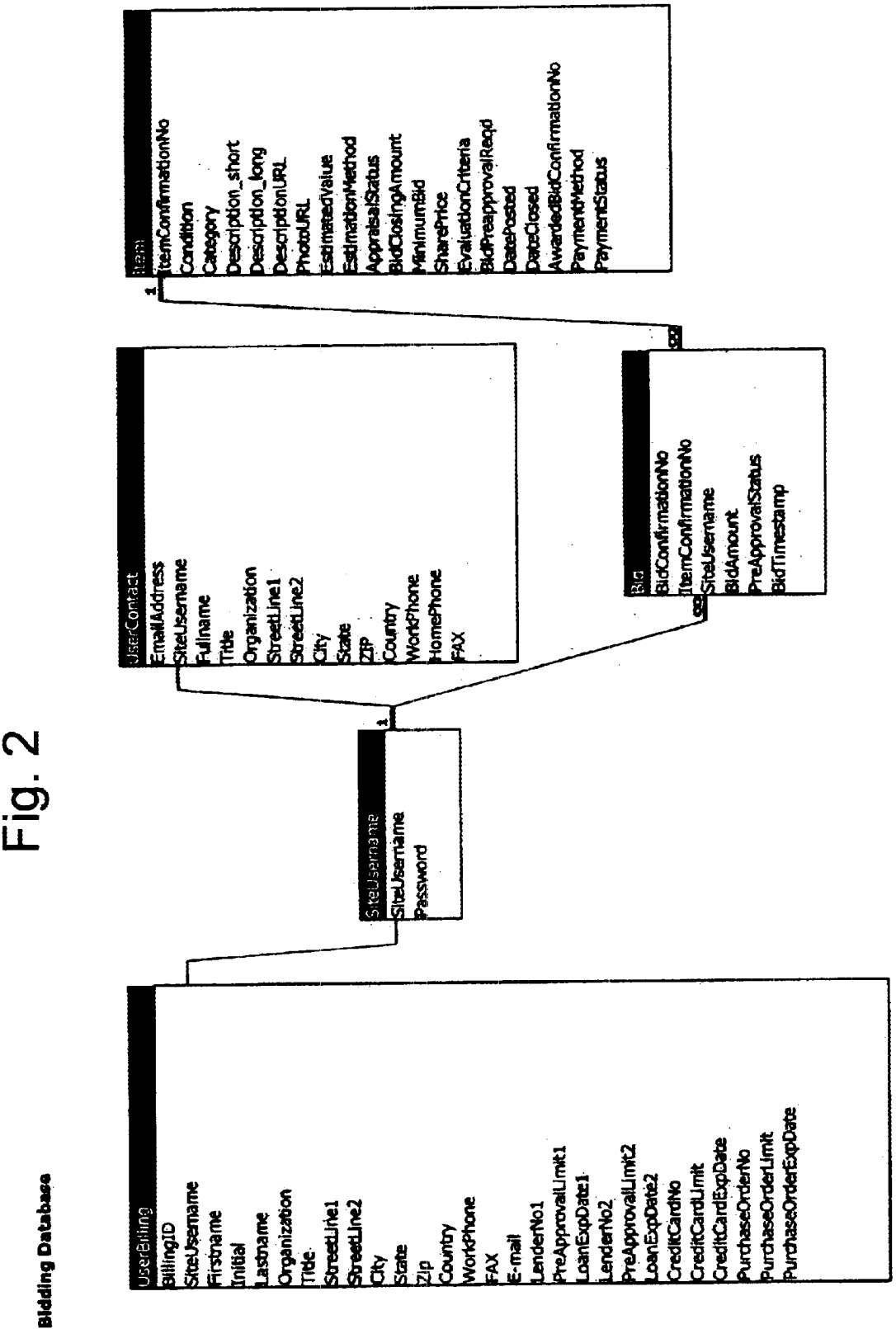
FIG. 2 illustrates an example of the various tables utilized to relate the fields in the data base design.

The steps involved in completing the sale of an item through the computer based auction system are outlined in the logic flow diagram in FIG. 1. The database tables showing the relationship among the fields are shown in FIG. 2.

A user would typically access the website URL (10) through the homepage shown in FIG. 3. The home page is a screen display that electronically presenting the computer-based auction and sale system which generally resides in the computer system. Users, customers and members of the computer-based auction and sale system can access certain computer programs, data and routines via the screen displays. These programs and data are accessed by placing and activating a cursor on a selected location on the display screen. Transfers between programs or data are sometimes called "links" or "cross-links".

A new user may want to obtain a site explanation (20) as shown in FIG. 4 and examine the bid strategy table (30) as shown in FIG. 5. As shown in FIG. 1, a user could chose to sell or view an item (40). To view items based on the selection criteria (60) for sale, the user would set selection criteria (50) by selecting relevant search criteria shown in FIG. 6. The search could include as many or as few of these criteria as the user wanted. The user could search by criteria that may include, item category, bid status, date posted, share price, minimum bid, shares required for bid closing, type of bid, item condition, item appraisal status and required bid preapproval. The item category criteria could include choices such as cars, trucks, planes, boats, motorcycles, buildings, homes, real estate, franchises, vacations, jewelry, or other. Of course, the categories can be modified to reflect the items being auctioned. The bid status criteria could include various choices for the percent of the required shares that have been purchased. The date posted criteria could include various time interval choices. For users interested in certain types of auction criteria, the user could search over several share price criteria, minimum bid criteria, number of shares required for bid closing, and the type bid used to select the buyer. Typical bid types include a selected bid, the highest bid, or an evaluated bid where the bid would meet some predetermined criteria such as the $10^{th}$, $50^{th}$ or $90^{th}$ percentile bid that could only be calculated after all bids were made. Other search criteria such as item condition, appraisal status and bid preapproval requirements could also be available. Using the search criteria, the user could then search the auction database for matching items.

The screen display of a typical search are shown in FIG. 7. Based on the number of items found, the user could narrow or broaden the search accordingly. From the search listing, the user could obtain more detail on a specific item of interest (70). The screen display of an item detail are shown in FIGS. 8A and 8B. The item detail could include any graphic images that the seller provided to the auction database.

Figure 11B:

If a user is interested in placing a bid for an item (80), the user must be registered (110). To register, the user would fill out a registration form (130) as shown in the screen display in FIGS. 11A and 11B. The information in the screen display would identify the user to an extent necessary to establish a payment method for bidding and purchasing. The user would be allowed to chose a unique site username and a password for use in bidding on the auction site. This information would be stored in the auction site database for future visits by the user.

Figure 9:
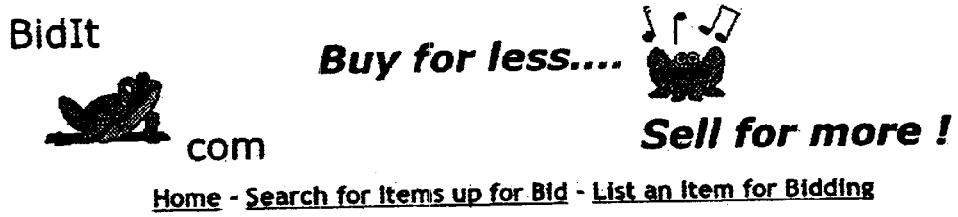
FIG. 9 illustrates a screen display showing an entry form for a bidder to use to place a bid for an item.

The computer-based auction and sale system may allow a registered user can either bid or sell an item (120). To place a bid on an item (90), the user would complete a bid form as shown in FIG. 9. The bid form would require the user to provide their site username and password to accept the bid. On certain items it may be necessary to obtain a pre-approval number to assure that if the user's bid is accepted, the bidder will have the financial resources to pay the amount bid.

If desired the user may participate in a discussion group to ask and answer questions (150) before the auction ends. After bidding is closed and the bid awarded (160), the seller and buyer notified (170) of the result so that transfer of payment to owner and ownership to winning bidder (180) can be completed.

The computer-based auction and sale system may allow the auction provider to list items for sale, or may obtain items from other manufacturers, wholesalers, suppliers, retailers or registered users. A registered user interested in placing an item up for bid (140) would complete a form as shown in FIGS. 10A and 10B. The seller would provide their site username and password. The seller would select a category for the item, and provide a description of the item and any available photos of the item.

The seller would then chose which of the available auction processes the seller would like to use to chose the winning bid. The auction system provides a wide variety of processes that may be used in determining the winning bid. In a selected bid, the winning bidder is chosen at random after the required numbers of nonredeemable shares have been sold. The winning bidder may also be chosen by evaluation after the combined contributions of all non-fundable shares have reached a seller provided limit; the evaluation criteria are set by the seller and include criteria from a ranking of bids (2nd highest, $10^{th}$, $50^{th}$, $90^{th}$ percentile, etc.). For example if the $10^{th}$ percentile criteria was chosen, 90 percent of the bidders would have bid higher than the winning bid amount and 10 percent of the bidders would have bid less than the winning bid amount.

Earliest submission time could be used as a tiebreaker in the case of two identical winning bids. Alternatively, the seller could chose to have the item awarded to the highest bid.

The seller of an item has the flexibility of distributing the price they receive for an item between the minimum bid portion and the nonredeemable fee or share portion. The nonredeemable fee portion consists of the number of non-redeemable shares the seller wants to sell and the fee for each nonredeemable share. The seller would decide the price and number of nonrefundable shares to sell, the time periods during which bids would be accepted and any minimum bid requirements. Of course, the minimum bid requirement could be substantially less than the amount than the market value of the item since the seller will also be compensated from the nonredeemable fees that are paid.

There are various strategies involved in both selling and placing a bid. Overall, because of the upfront purchase of non-refundable shares when a bid is made, the method can allow sellers to obtain a sales price on an item that is typically above the market cost of an item; it also can allow the buyer to purchase an item at a price that is typically below the market cost of an item.

The computer based method electronically blocks customers from becoming bidders and posting bids until those customers have electronically registered. Preregistration may occur completely electronically or portions may be completed through other means such as by telephone. The computer-based method electronically posts all bids made by bidders on the plurality of products and services during the bid period.

Although a single integrated system for membership and merchandise has been illustrated herein, multiple separate systems for each task may also be utilized. The separate systems could be linked to allow sharing of information. The data structure set forth herein is an example of the necessary data management protocol.

A computer site for auctioning a product on-line according to the present invention comprises at least one web server computer designed for serving a host of computer browsers and providing said browsers with the capability to participate in various auctions. The database computer would be accessible to the web computer server computer to allow selective retrieval of product information which includes:

a) a category for listing the product;
b) a product description;
c) the quantity of the product to be auctioned;
d) at least one product image;
e) the type of auction;
f) the evaluation criteria for selecting the bidder to be awarded the product;
g) sellers total price for the product;
h) number of nonredeemable shares to be sold;
i) price for each nonredeemable share;
j) date and time period the nonredeemable shares will be sold;
k) date and time period the product will be auctioned.

The web server computer includes custom written application software for auctioning any product identified in the database computer by displaying, during an auction, the number of nonredeemable shares that have been sold as well as any time limitations.

We claim:

1. A method for using a computer to facilitate auctioning items on-line comprising:
   (a) Inputting a plurality of items into the computer whereas each item comprises;
      (i) an item description,
      (ii) a bid selection criteria,
      (iii) an item price consisting of a minimum bid, and
      (iv) a nonredeemable fee portion consisting of
         a minimum required number of nonredeemable shares to sell, and
         a price for a nonredeemable share;
   (b) selling the nonredeemable shares to a plurality of bidders;
   (c) obtaining bids from the bidders;
   (d) terminating bidding when the minimum required number of nonredeemable shares have been sold;
   (e) determining a buyer from among the bidders;
   (f) notifying the buyer;

(g) collecting the buyer's bid;

(h) using the buyer's bid and the nonredeemable fee portion from the plurality of bidders to pay the item price; and (i) transferring the item to the buyer.

2. The method of claim 1 wherein the bid selection criteria of step (a) further comprises a means to award the bid to the bidder nearest a predetermined percentile bid, the percentile bid not being a high bid and only being determinable after all bids have been received.

3. The method of claim 1 wherein the bid selection criteria of step (a) is the high bid.

4. The method of claim 1 wherein the minimum bid of step (a) is zero dollars.

5. A computer system for conducting an on-line auction of an item comprising:

(a) at least one computer server;

(b) at least one computer network connected to a computer;

(c) a plurality of bidders connected to the computer network;

(d) the item having a price, the item further having a minimum bid, a minimum number of nonredeemable shares, each nonredeemable share having a price;

(e) means for describing the item to the bidders;

(f) means for describing the on-line auction to the bidders;

(g) means for allowing the bidders to purchase the non-redeemable shares;

(h) means for allowing the bidders to place bids;

(i) means for selecting a buyer of the item from the bidders; and (j) means for using the nonredeemable shares from the plurality of bidders and the buyer's bid to pay the item price.

6. The computer system of claim 5 in which the on-line auction further comprises a bid selection criteria to award the bid to the bidder nearest a predetermined percentile bid, the percentile bid not being a high bid and only being determinable after all bids have been received.

7. The computer system of claim 5 in which the means for selecting a buyer of the item from the bidders is to select the high bid.

8. The computer system of claim 5 in which the minimum bid is zero dollars.

* * * * *

UNITED STATES PATENT AND TRADEMARK OFFICE
CERTIFICATE OF CORRECTION

| | |
|---|---|
| PATENT NO. | : 6,671,674 B1 |
| APPLICATION NO. | : 09/526897 |
| DATED | : December 30, 2003 |
| INVENTOR(S) | : Claude T. Anderson and Michael G. Reith |

It is certified that error appears in the above-identified patent and that said Letters Patent is hereby corrected as shown below:

Title Pg, Item (56), under "OTHER PUBLICATIONS", in column 2, line 9, please add:

Alaska Offering Rare Opportunity To Buy Or Homestead State Lands;

PR Newswire, 5 September 1995.

FCC Decrees Auctions Instead Of Lotteries Will Determine Future License Winners;

Interactive Video News, v2, n9, May 2, 1994.

Page 1 of 1

Signed and Sealed this

Twenty-second Day of December, 2009

David J. Kappos
*Director of the United States Patent and Trademark Office*